UNITED STATES PATENT OFFICE.

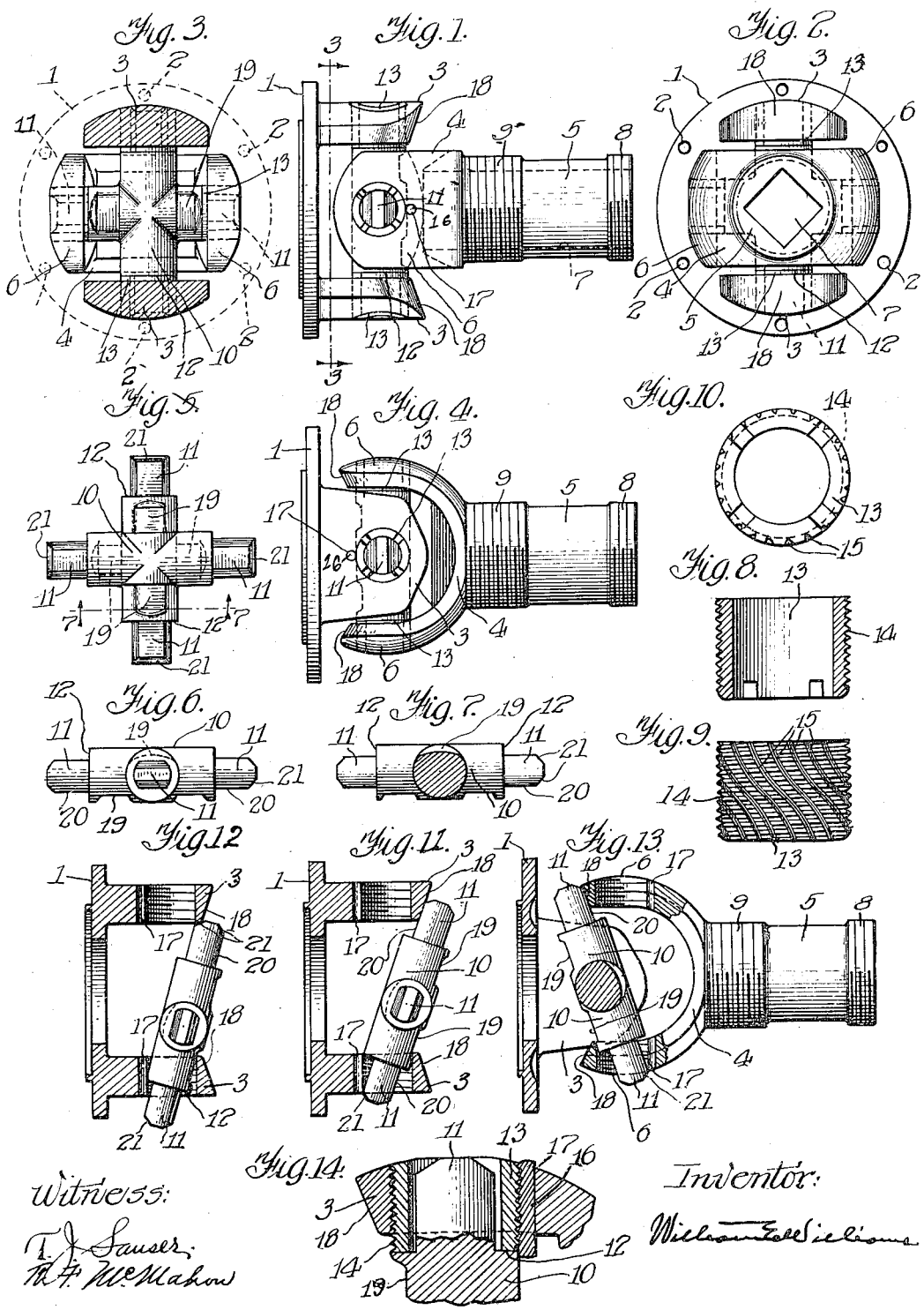

WILLIAM ERASTUS WILLIAMS, OF CHICAGO, ILLINOIS.

UNIVERSAL JOINT.

1,253,919.     Specification of Letters Patent.     Patented Jan. 15, 1918.

Application filed April 11, 1916. Serial No. 90,310.

*To all whom it may concern:*

Be it known that I, WILLIAM ERASTUS WILLIAMS, a citizen of the United States, and a resident of Chicago, county of Cook, and State of Illinois, have invented a new and useful Improvement in Universal Joints for Power-Transmitting Shafts, of which the following is a specification.

My joint is especially adapted for use with automobiles where lightness in weight, small compass and ability to sustain severe shocks and variations in load are desirable.

The object of my invention is to provide a secure and serviceable joint with little expense and one that will occupy the smallest space possible consistent with other features involved, and further to make a joint wherein the strains are transmitted by direct contact from metal surface to metal surface as much as possible in lines and directions that do not serve to loosen the fastenings or jointed parts of the device.

Reference will be had to the accompanying drawings in which I have shown only the simple parts and omitted the casing and other features which are common to joints of this class.

Figure 1 indicates a side elevation of my joint.

Fig. 2 is an end elevation at right of Fig. 1.

Fig. 3 is a sectional end elevation on line 3—3 of Fig. 1.

Fig. 4 is a plan view of the structure seen in side elevation in Fig. 1.

Fig. 5 is an elevation of the cross or trunnion block.

Fig. 6 is an end view looking from the right in Fig. 5.

Fig. 7 is a sectional view on line 7—7 of Fig. 5.

Fig. 8 is a sectional view of one of the bushings.

Fig. 9 is an elevation of one of the bushings.

Fig. 10 is a plan view of the bushing.

Fig. 11 is a view showing how the trunnion block is inserted into the holes of the horns of the flange plate.

Fig. 12 is a similar view to Fig. 11 after the trunnion block has proceeded farther in its insertion.

Fig. 13 is a similar view showing a succeeding position of the trunnion block as it is being placed in position.

Fig. 14 is an enlarged view through one of the bushings and its horn and trunnion block, showing the method of locking the bushings from coming loose and screwing out from strains in service.

In the drawing 1 indicates the flange plate member now ordinarily used more or less as a standard for universal joints for automobile drive shafts. This is simply a flat plate with holes 2 on its margin as indicated by dotted lines in Fig. 3. This plate is either bolted to another plate forming the shaft connection or else is bolted direct to some part of the transmission adapted to receive it. Fixed on this plate 1 as a part of the plate itself there are two horns 3. The practice is to make a plate 1 with its horns a dropped forging in one piece, and this plate then forms one of the main members of the joint.

The other member 4 of the joint is composed of a sleeve or shaft socket end from the body 5 of which project two horns 6, analogous to the horns 3. The socket 5 is provided with a socket hole 7 adapted to receive a square shaft or a splined end of a shaft as desired. The member 5 is threaded at 8, 9 to receive ordinary grease-holding casing fixtures not shown.

The intermediate or connecting member is a one-piece trunnion block or cross 10, made as strong as the general design of the joint will permit. In joints of this class the trunnions or pivot blocks corresponding to my cross 10 have varied in construction materially, and the most desirable forms are made in a single rigid piece, having the trunnions integral with the body of the block as the shocks in this piece of the joint are severe and tend to weaken any machined fastening where the design provides for fitted in trunnions or pivot pins. On the end of my block 10 there are the integral trunnions or pivots 11. The block is made of a solid drop forging and the trunnions are machined up on the ends of the block leaving machined shoulders 12.

Screwed into the horns 3 and 6 of the other two members there are trunnion bushings 13 which are made of suitable material and hardened for bearing purposes and inside of which the trunnions 11 articulate.

In assembling the three members of my joint, as here shown, the trunnion block 10 is moved endwise of one of its arms into the horns 3 on one side, as is indicated by Figs. 11 and 12; then the block is rotated slightly from the position of Fig. 12 and brought into normal position in the holes in the horns ready to receive the bushings 13, which are then screwed in endwise of the trunnions.

The trunnion block 10 is inserted into the horn 6 of the part 4 in a similar manner, as is indicated by Fig. 13.

On the outside of the bushings 13 there is a regular thread 14 adapted to fit into the threads of the horns in the ordinary manner of a threaded connection. In addition to the threads 14 I provide some spiral grooves 15 running in the opposite direction from threads 14 and intersecting the threads at the same depth as the regular threads. These spiral grooves are designed to be so close together that one or more intersections of the spiral grooves with the regular threads will occur in any vertical line on the circumference of the bushing. On the inner side of the holes in the horns into which the bushings are screwed, I provide small holes 17 adapted to receive a soft iron or copper wire 16 alongside and open to the threads of the bushing. When the bushing is screwed home, the soft wire 16 is driven in filling the hole 17 and then the wire is compressed farther endwise with a punch forcing the body of the wire to expand outward and into the intersections between the ordinary threads and spiral grooves of the bushing, thus making a positive lock which prevents the bushings from jarring loose.

When the trunnion block or cross 10 is made small enough in its body to enter into the holes of the horns without cutting away the sides as I have indicated, the block is not strong enough to meet the demands of service if made within the dimension limits which are practically established as standard sizes by the automobile trade.

I succeed in making my joint small enough and strong enough in the general form indicated by making my parts in proper proportion to each other, making the cross or trunnion block short and stocky and in order to get this stocky trunnion block assembled in place I bevel the ends of the horns 3 and 6, as is indicated by 18, and cut out on the alternate side of the trunnion block, clearance spaces 19, and I flatten the sides of the trunnions 11 as is indicated by 20, and cut off the corners of the trunnions, as is indicated by 21. This flattening of the sides and cutting of the corners of the trunnions does not lessen to any material extent the strength of the trunnion blocks or their wearing surfaces, as those faces are in what might be termed neutral zones, the chief strength and wear being in the direction of rotation.

In some joints now in use, more or less similar in appearance to my joint, the bushings are held in holes which are not complete, or in other words the bushing is embraced only a part way around, the horns having open ends where the bushings are bare on the outside. With this design the bushings frequently become loose for lack of sufficient embrace in the body of the horns. My bushings are embraced all the way around and thus are held firmly, which is a great desideratum.

Unless I used the peculiar shape of my trunnion block and horn ends, I could not make in this style of a joint, a joint that would meet with the conditions that must be met in the joint market of today.

What I claim is:

1. The combination with driving and driven members each provided with a pair of terminal horns having alining transverse holes, of a block having integral quadrantally located trunnions to enter said holes, respectively, all the trunnions being flattened laterally at one side of their common central plane, whereby inserting the trunnions in said holes is facilitated while nearly full resistance to torsional strains of working is preserved.

2. The combination with driving and driven members each provided with a pair of terminal horns having alining transverse holes, of a block having integral, quadrantally located arms reduced in diameter to form terminal trunnions adapted to enter said holes, respectively, the unreduced portions of said arms being flattened at one side of their common central plane and the trunnions being flattened on the opposite side of said plane.

3. The combination with driving and driven members each provided a pair of terminal horns having alining transverse holes, of a block having integral arms quadrantally located in the same plane and each reduced to form terminal trunnions with shoulders at their bases, and bushings secured in said holes and meeting said shoulders, forming bearings for the trunnions; said arms and trunnions being laterally flattened at some distance from their common central plane.

4. The combination with driving and driven members each provided with a pair of terminal horns having alining transverse threaded holes, of bushings engaged in said holes respectively, and a one-piece cross-member having the free end portions of its arms reduced in diameter to form terminal trunnions fitting in the corresponding bushings and having at their bases shoulders to receive the ends of the bushings; said arms and trunnions being flattened upon the sides most distant from their common central plane, and said horns being terminally beveled to allow the flattened trunnions to pass more readily into said holes, substantially as set forth.

5. In a device of the class described, the combination with driving and driven members each having a pair of terminal horns provided with transverse holes, screwthreaded bushings engaged in said holes, respectively, and provided with grooves intersecting the threads and thereby forming shoulders to aid in holding the bushing against displacement.

6. In a device of the class described, the combination with driving and driven members each provided with a pair of arms having transverse alining threaded holes each of which has in its wall a channel intersecting its threads, threaded bushings engaging in said holes, respectively, and each having a spiral groove intersecting its threads, and a soft metal pin driven into said channel and expanded at the intersection of the threads with said spiral groove.

7. In a device of the class described a driving and a driven member each provided with horns having transverse holes and adapted to join an intermediate member in the form of a trunnion block, bushings inserted in said holes, respectively, to serve as bearings, a trunnion block forming the connecting piece between the driving and driven members, and made in the form of a cross with the arms made stocky and strong and trunnions smaller than the ends of the arms, thus forming shoulders at the base of the trunnions, the body of the cross arms of the trunnion block being cut away on alternate sides below the shoulders to assist in the insertion of the trunnion block from the inside of the horns, and the bushings having intersecting threads or grooves for the purpose set forth.

8. In a device of the class described, the combination with a threaded bushing seat, of an externally threaded bearing bushing having spiral grooves intersecting its threads, and a device to enter the spaces at the intersection of the threads and grooves for locking the bushing against rotation in its seat.

9. In devices of the class described, the combination with a threaded bushing seat internally grooved transversely to its threads, of an externally threaded bushing having spiral grooves intersecting its threads, and a soft metal plug driven in the groove in said seat and swaged into the spaces at the intersection of the threads and grooves of the bushing.

10. In devices of the class described, bearing bushings provided with external screw threads and with spiral grooves intersecting said threads, whereby the bushing may be engaged at the intersections of the grooves and threads and prevented from rotating.

11. In devices of the class described, the combination with an internally threaded bushing seat grooved transversely of the threads, of a bushing externally threaded, provided with spiral grooves intersecting its threads, and engaged in said seat, and a soft metal plug forced into the groove in the seat to engage and lock the bushing.

Signed in Chicago, in the State of Illinois, and county of Cook, this 20th day of March, 1916.

WILLIAM ERASTUS WILLIAMS.